US 6,731,864 B1

(12) United States Patent
Ito et al.

(10) Patent No.: US 6,731,864 B1
(45) Date of Patent: *May 4, 2004

(54) RECORDING METHOD/APPARATUS, REPRODUCING METHOD/APPARATUS, RECORDING/REPRODUCING METHOD/ APPARATUS, AND DISK-SHAPED RECORDING MEDIUM CAPABLE OF INCREASING DATA TRANSFER RATE AND CAPABLE OF READILY MANAGING ADDRESSES

(75) Inventors: Yoshiyuki Ito, Tokyo (JP); Toshiyuki Ishii, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1113 days.

(21) Appl. No.: 08/772,888

(22) Filed: Dec. 24, 1996

(30) Foreign Application Priority Data

Dec. 28, 1995 (JP) .............................................. 7-352829

(51) Int. Cl.[7] .............................................. H04N 5/926
(52) U.S. Cl. ...................................... 386/124; 386/125
(58) Field of Search .............................. 386/45, 70, 82, 386/95, 108, 125, 126; 348/220, 232, 409, 231; 360/35.1

(56) References Cited

U.S. PATENT DOCUMENTS

| | | | | | |
|---|---|---|---|---|---|
| 4,825,324 | A | * | 4/1989 | Miyake et al. | 360/35.1 |
| 5,142,521 | A | * | 8/1992 | Terashima et al. | 386/126 |
| 5,376,965 | A | * | 12/1994 | Nagasaki et al. | 348/232 |
| 5,444,482 | A | * | 8/1995 | Misawa et al. | 348/220 |
| 5,477,264 | A | * | 12/1995 | Sarbadhikari et al. | 348/231 |
| 5,510,905 | A | * | 4/1996 | Birk | 386/125 |
| 5,801,777 | A | * | 9/1998 | Lyu | 348/409 |

* cited by examiner

Primary Examiner—Thai Tran
Assistant Examiner—Christopher Onuaku
(74) Attorney, Agent, or Firm—Frommer Lawrence & Haug LLP; William S. Frommer; Glenn F. Savit

(57) ABSTRACT

Picture image data having high image quality is recorded in a disk-shaped recording medium such as a hard disk and a removable disk. A recording apparatus is arranged by a first unit for recording image data with respect to a disk-shaped recording medium in which an outer peripheral sided region thereof is recordable/reproduceable at a higher rate than that of an inner peripheral sided region thereof, and a second unit for designating an attribute of image data recorded in the disk-shaped recording medium. When the second unit designates image data having a large data amount per unit time, the first unit records the image data having the large data amount per unit time in the inner peripheral sided region of the disk-shaped recording medium, whereas when the second unit designates image data having a small data amount per unit time, the first unit records the image data having the small data amount per unit time in the inner peripheral sided region of the disk-shaped recording medium.

37 Claims, 6 Drawing Sheets

71 : moving picture image recording key
72 : still picture image recording key
73 : moving picture image reproducing key
74 : still picture image reproducing key

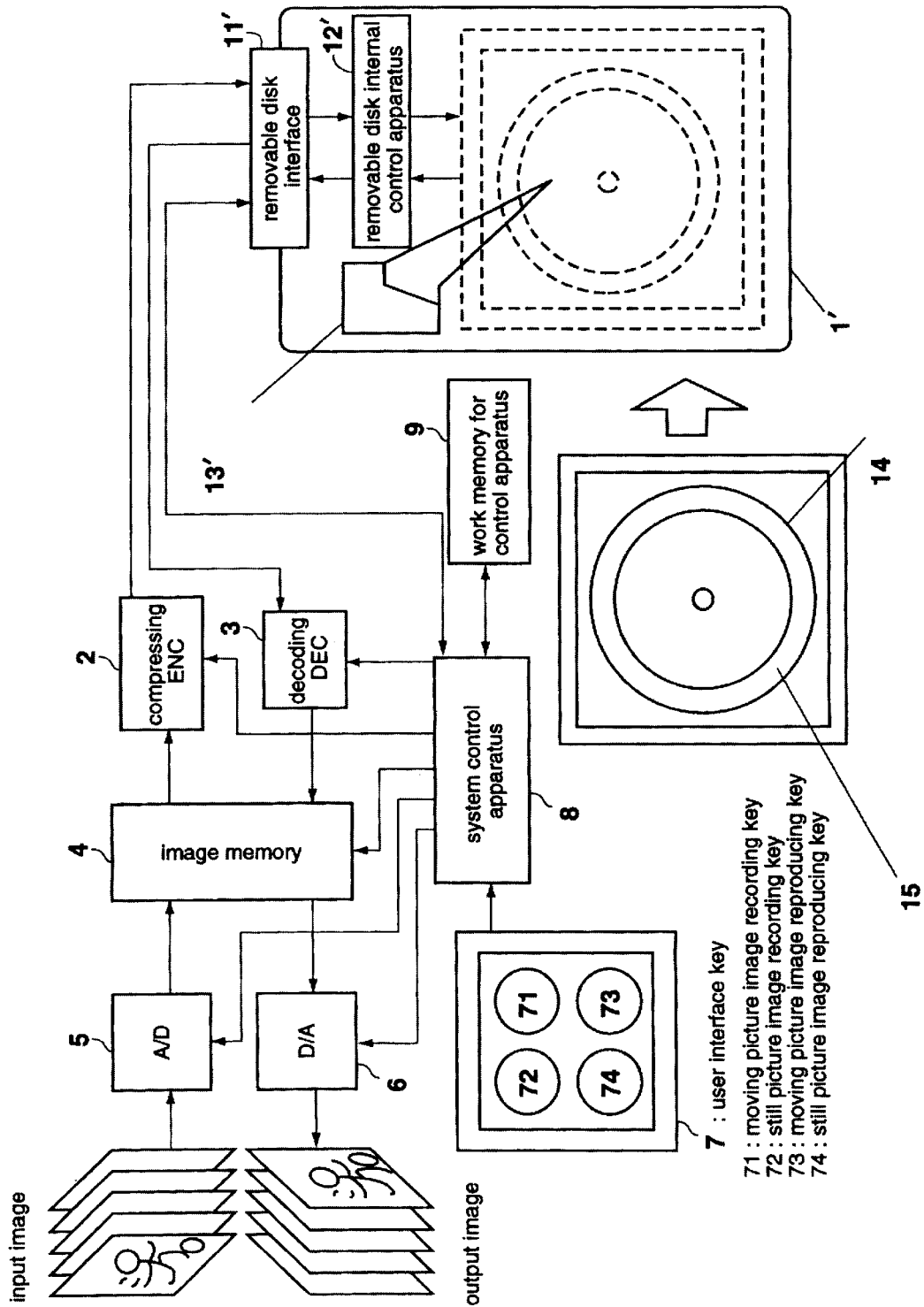

RECORDING METHOD/APPARATUS, REPRODUCING METHOD/APPARATUS, RECORDING/REPRODUCING METHOD/APPARATUS, AND DISK-SHAPED RECORDING MEDIUM CAPABLE OF INCREASING DATA TRANSFER RATE AND CAPABLE OF READILY MANAGING ADDRESSES

BACKGROUND OF THE INVENTION

The present invention generally relates to techniques for recording/reproducing video data and audio data which have been compress-coded with respect to a disk-shaped recording medium such as a magnetic disk. More specifically, the present invention is directed to techniques capable of increasing a transfer rate of recording/reproduced data and also capable of readily managing addresses.

Various hard disk apparatuses are commercially available as auxiliary storage units for computer usage. A hard disk used in a hard disk apparatus as a storage medium is realized by that plural sheets of magnetic disks made by coating magnetic materials on flat boards are stacked and rotated at a speed of several thousands rpm (rotation per minute). The quantity of magnetic disks are determined based on memory capacities. Coaxial-shaped recording tracks are set on a recording surface of a magnetic disk. Then, in each of these recording tracks, data are recorded in a unit called as a sector (normally, 1 sector being equal to 512 bytes). A sector is defined by segmenting a recording track by a fan shape. A sector address is set to a sector. A data recording/reproducing position may be designated by designating this sector address.

The zone bit recording system has been introduced in a hard disk. As illustrated in FIG. 1, the zone bit recording system is intended to achieve high density in such a manner that the surface of the magnetic disk is subdivided into a plurality of zones in a coaxial shape, the signal transfer speed is stepwise changed every zone while increasing the sector density in the outer peripheral zone and decreasing the sector density in the inner peripheral zone, and thus the recording density on the surface is averaged. Such a system is called as a ZCAV (Zoned Constant Angular Velocity) system in contrast to the conventional CAV (Constant Angular Velocity).

A hard disk owns the following features because such a ZCAV system is employed. That is, as shown in FIG. 2, the data read/write transfer rate of the outer peripheral zone is high, and the data record/write transfer rate is stepwise lowered along the inner peripheral zone. As a consequence, the data read/write transfer rate is minimum in the innermost zone.

Sector addresses of sectors which correspond to data transmit/receive units with respect to an external system are allocated to these zones from the outer peripheral zone to the inner peripheral zone. A starting address is present in the outermost peripheral zone, whereas an end sector address is present in the innermost peripheral zone.

In connection with great progress of large memory capacities and low cost of hard disks as well as great advances in data compression techniques, video (picture) data and audio data may be compressed in accordance with the international standard data compression system of MPEG (Moving Picture Image Coding Experts Group), and the compressed data may be recorded and/or reproduced in/from hard disks.

Conventionally, hard disks have been used as storage media for storing computer data. As a result, if an external host system can correctly recognize a sector address position on a hard disk and can correctly read/write data at this sector address position, then it is not an important aspect as to how the data is arranged at which sector address position on this hard disk. That is, it is not important to grasp the actual data read/write transfer rate, and where the relevant data is arranged with respect to the sector address position.

However, in such a case that data such as video data is required to be continuously read and/or written in real time and further data having a large information amount is recorded and/or reproduced, if these data are arranged irrelevant to own sector address positions on the hard disk in a similar manner to the computer use, then the seek operation for transporting the magnetic head to a target track, and also the rotation waiting operation until the target sector is located upright the magnetic head will frequently occur while the data is recorded and/or reproduced. Accordingly, such a phenomenon will occur that the average data transfer rate is lowered, and thus the data cannot be recorded and/or reproduced in time on the side of the external host system.

Also, the maximum transfer rate at which the data can be recorded and/or reproduced from the external system side cannot be increased higher than the transfer rate of the innermost peripheral zone of the hard disk. Therefore, there is another problem that the transfer rate of the video data cannot be excessively increased.

For instance, as indicated in a transition diagram of data transfer operation as viewed from the host system side, as shown in FIG. 3, since a limit value of a data transfer rate on the host system side is lower than a limit value of a data transfer rate of a hard disk from a zone 1 up to a zone 3, the data is transferred at the transfer speed on the host system side. However, since the limit value of the data transfer rate on the host system side becomes higher the limit value of the data transfer rate on the hard disk side from a zone 4 to a zone 6, the data is transferred at the transfer rate on the hard disk side.

As a consequence, the transfer rate of the data recordable and/or reproduceable from the host system could not be increased higher than the transfer rate of the zone 6. Accordingly, since the transfer rate of the video data could not be increased so high, there is a further problem that the video data having the high image quality could not be recorded and/or reproduced.

SUMMARY OF THE INVENTION

The present invention has been made to solve the above-described problems, and therefore, has an object to provide a recording method/recording apparatus, a reproducing method/reproducing apparatus, a recording/reproducing method, a recording/reproducing apparatus, and a disk-shaped recording medium, by which video (picture) data with a high image quality can be recorded and/or reproduced.

To achieve the above-described object, the method according to the present invention is featured by that when at least image data is recorded and/or reproduced with respect to a disk-shaped recording medium, the method records and/or reproduces image data having a large data amount per unit time in an outer peripheral sided region of the disk-shaped recording medium; and records and/or reproduces one of image data and system data, having a small data amount per unit time in an inner peripheral sided region of the disk-shaped recording medium.

Also, the apparatus according to the present invention is featured by comprising: first means for recording and/or reproducing image data with respect to a disk-shaped recording medium in which an outer peripheral sided region thereof is recordable and/or reproduceable at a higher rate than that of an inner peripheral sided region thereof; and second means for designating an attribute of image data recorded and/or reproduced in/from the disk-shaped recording medium; wherein: when the second means designates image data having a large data amount per unit time, the first means records and/or reproduces the image data having the large data amount per unit time in the inner peripheral sided region of the disk-shaped recording medium, whereas when the second means designates image data having a small data amount per unit time, the first means records and/or reproduces the image data having the small data amount per unit time in/from the inner peripheral sided region of the disk-shaped recording medium.

Furthermore, a disk-shaped recording medium, according to another aspect of the present invention, is featured by that image data having a large data amount per unit time can be recorded and/or reproduced in an outer peripheral sided region of the disk-shaped recording medium; one of image data and system data, having a small data amount per unit time can be recorded and/or reproduced in an inner peripheral region thereof; and information used to discriminate a relationship between each of the regions and a transfer rate of data is saved.

In this case, the image data having a large data amount per unit time corresponds to, for instance, such moving picture image data which requires the real time characteristics. Also, the image data having a small data amount per unit time corresponds to, for example, such still picture image data which does not require the real time characteristics. Then, the system data implies, for instance, time information and file information used on the system side.

As a result, according to the present invention, the recording region is determined by considering the attribute of the data to be recorded. The moving picture image data which requires the higher data transfer rate is arranged in the outer peripheral-sided region of the disk where the data can be transferred in high speed. Accordingly, the information amount of the single moving picture image data can be increased, and thus the image quality thereof can be improved.

Since only the moving picture image data is recorded in such an area for recording the moving picture image data, there is a small possibility such that the data are arranged at random on the disk-shaped recording medium as in the conventional system. As a consequence, the total time required for the seeking operation and the rotation waiting operation could be reduced, and in view of this point, the data transfer rate could be increased.

BRIEF DESCRIPTION OF THE DRAWINGS

For a better understanding of the present invention, reference may made to the accompanying drawings, in which:

FIG. 6 is a schematic block diagram for representing an arrangement of a removable disk recording/reproducing apparatus to which the present invention is applied.

DETAILED DESCRIPTION OF THE PREFERRED EMBODIMENTS

Referring now to drawings, various preferred embodiments of the present invention will be described in accordance with the below-mentioned order:
[1] ARRANGEMENT OF DATA RECORDING AREAS ON MAGNETIC DISK TO WHICH PRESENT INVENTION IS APPLIED.
[2] HARD DISK RECORDING/REPRODUCING APPARATUS TO WHICH PRESENT INVENTION IS APPLIED.
　(1) ARRANGEMENT OF HARD DISK RECORDING/REPRODUCING APPARATUS.
　(2) RECORDING/REPRODUCING OPERATION OF MOVING PICTURE IMAGE DATA.
　(3) RECORDING/REPRODUCING OPERATION OF STILL PICTURE IMAGE DATA.
[3] REMOVABLE DISK RECORDING/REPRODUCING APPARATUS TO WHICH PRESENT INVENTION IS APPLIED.
　(1) ARRANGEMENT OF REMOVABLE DISK RECORDING/REPRODUCING APPARATUS.
　(2) INITIALIZATION OF SYSTEM.
　(3) RECORDING/REPRODUCING OPERATION OF MOVING PICTURE IMAGE DATA.
　(4) RECORDING/REPRODUCING OPERATION OF STILL PICTURE IMAGE DATA.
[1] ARRANGEMENT OF DATA RECORDING AREAS ON MAGNETIC DISK TO WHICH PRESENT INVENTION IS APPLIED.

Figure 1:
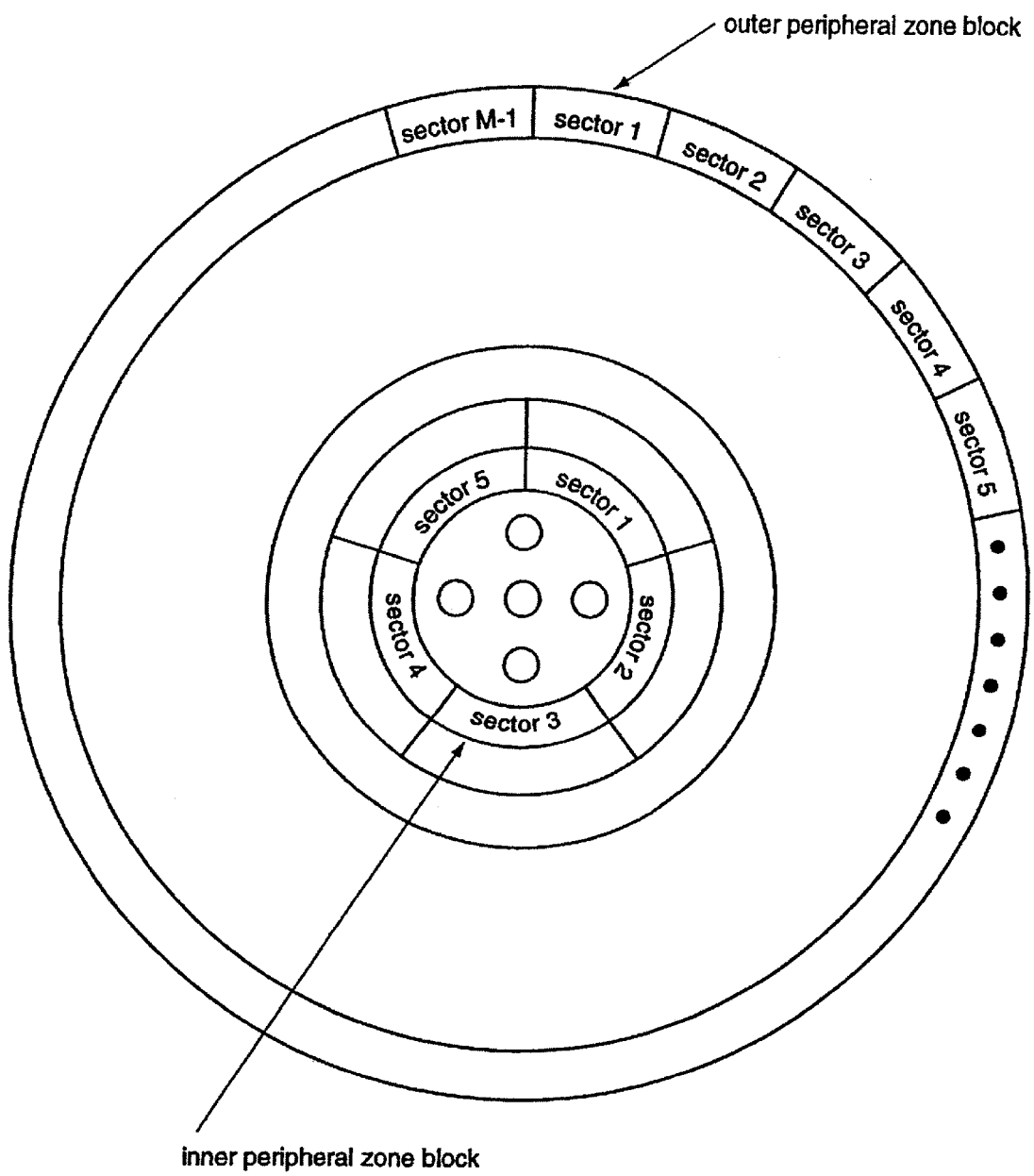
FIG. 1 is a conceptional schematic diagram for representing the zone bit recording system in a hard disk.
Figure 2:
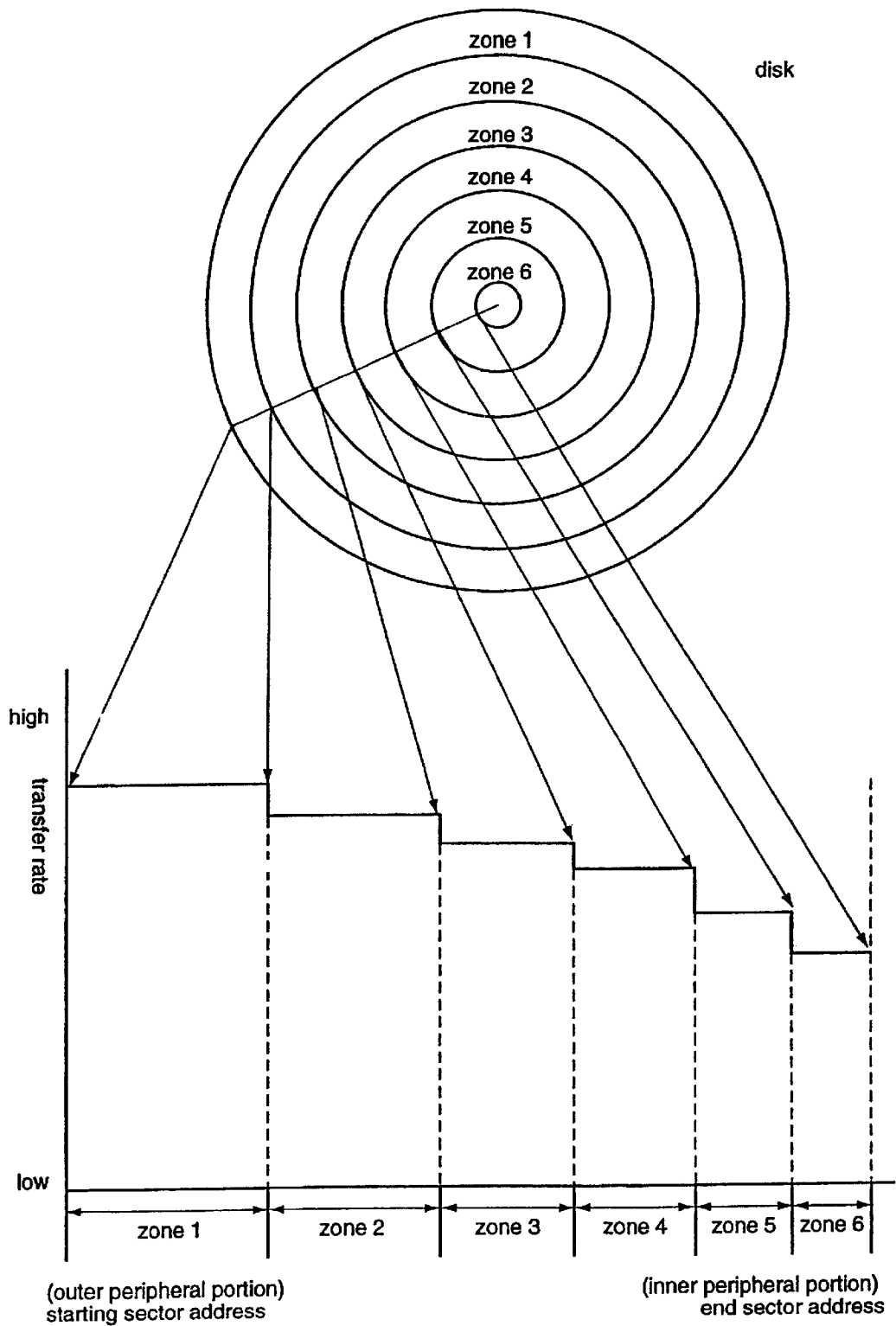
FIG. 2 schematically represents a transition diagram of transfer rates corresponding to the respective zones of the hard disk.
Figure 3:
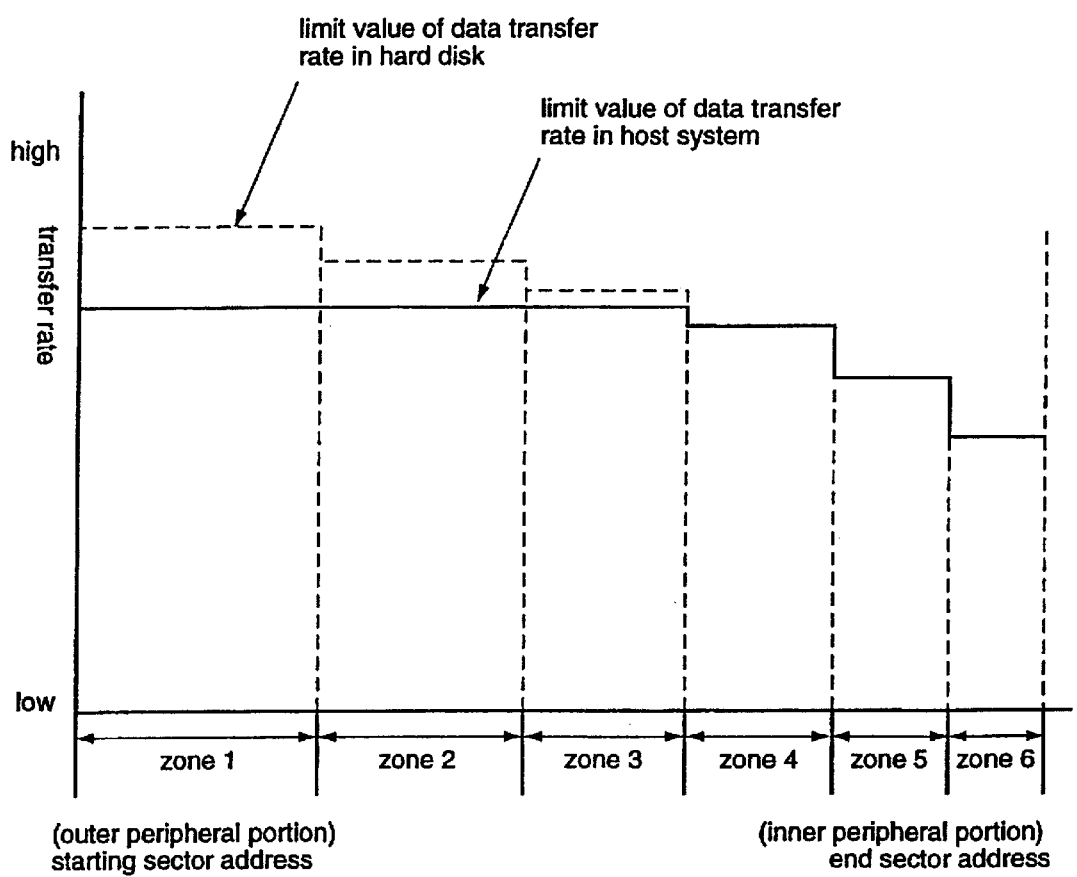
FIG. 3 schematically indicates a transition diagram of data transfer rate, as viewed from a host system side.
Figure 4:
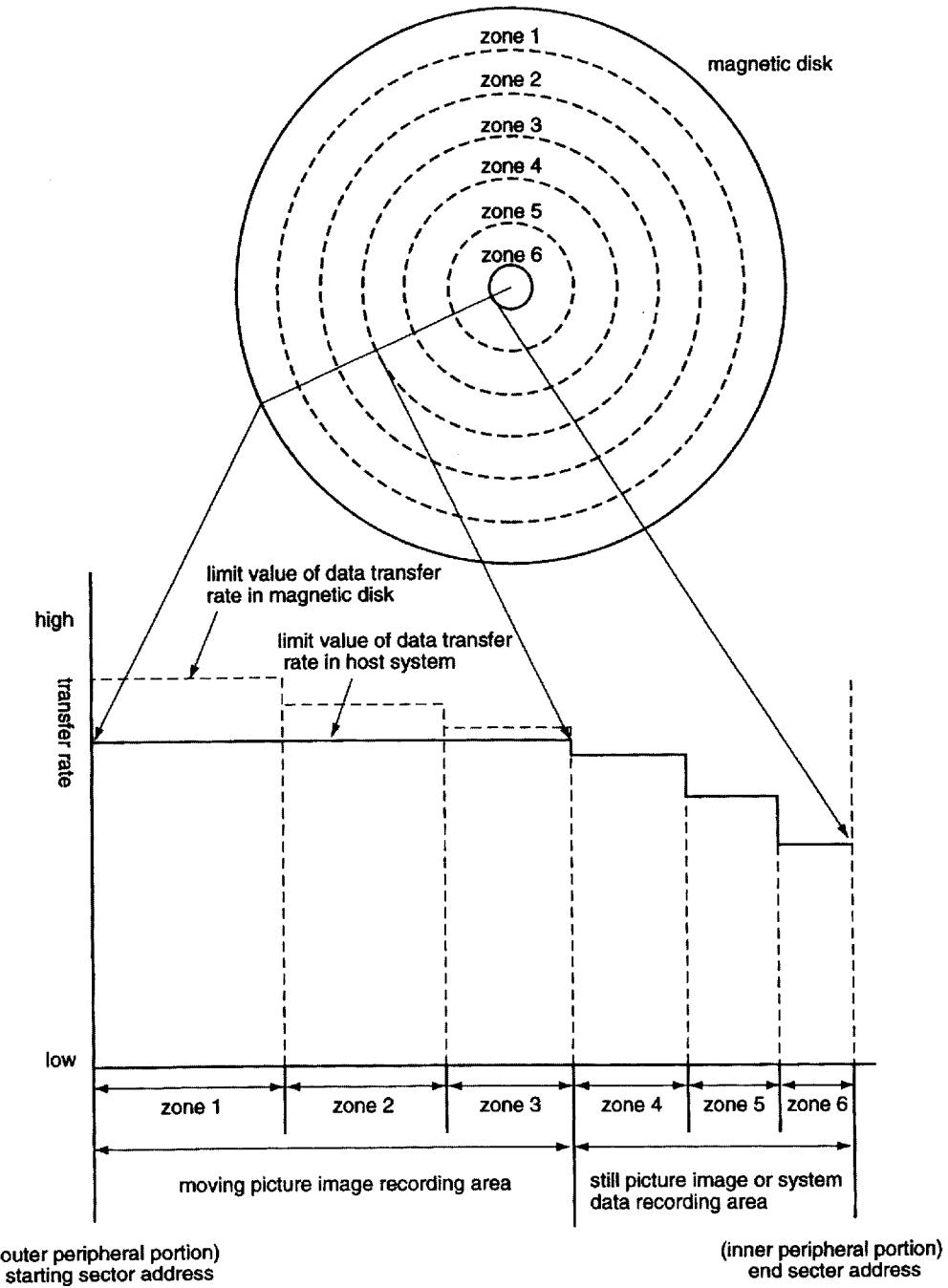
FIG. 4 schematically illustrates an arrangement of a data recording area on a magnetic disk to which the present invention is applied.

FIG. 4 schematically shows an arrangement of data recording areas on a magnetic disk to which the present invention is applied. As shown in this drawings, zones defined from a zone 1 to a zone 3 where data can be transferred in a transfer rate required on the side of a host system are used as a moving picture image recording area where moving picture image data is recorded. The moving picture image data contains a large amount of information, and requires real time characteristics. Then, zones defined from a zone 4 to a zone 6 where data cannot be transferred in a transfer rate required on the side of the host system are used as a still picture image or system data recording area. The still picture image data, or the system data contains not so large amount of information, and does not highly required real time characteristics.

As a consequence, the moving picture image data may be recorded and/or reproduced in the data transfer rate of the zone 3. To the contrary, since the moving picture image data could not be recorded and/or reproduced in the data transfer rate of the zone 6 in the prior art system, the data transfer rate of the present invention can be improved.

[2] HARD DISK RECORDING/REPRODUCING APPARATUS TO WHICH PRESENT INVENTION IS APPLIED
　(1) ARRANGEMENT OF RECORDING/REPRODUCING APPARATUS

Figure 5:
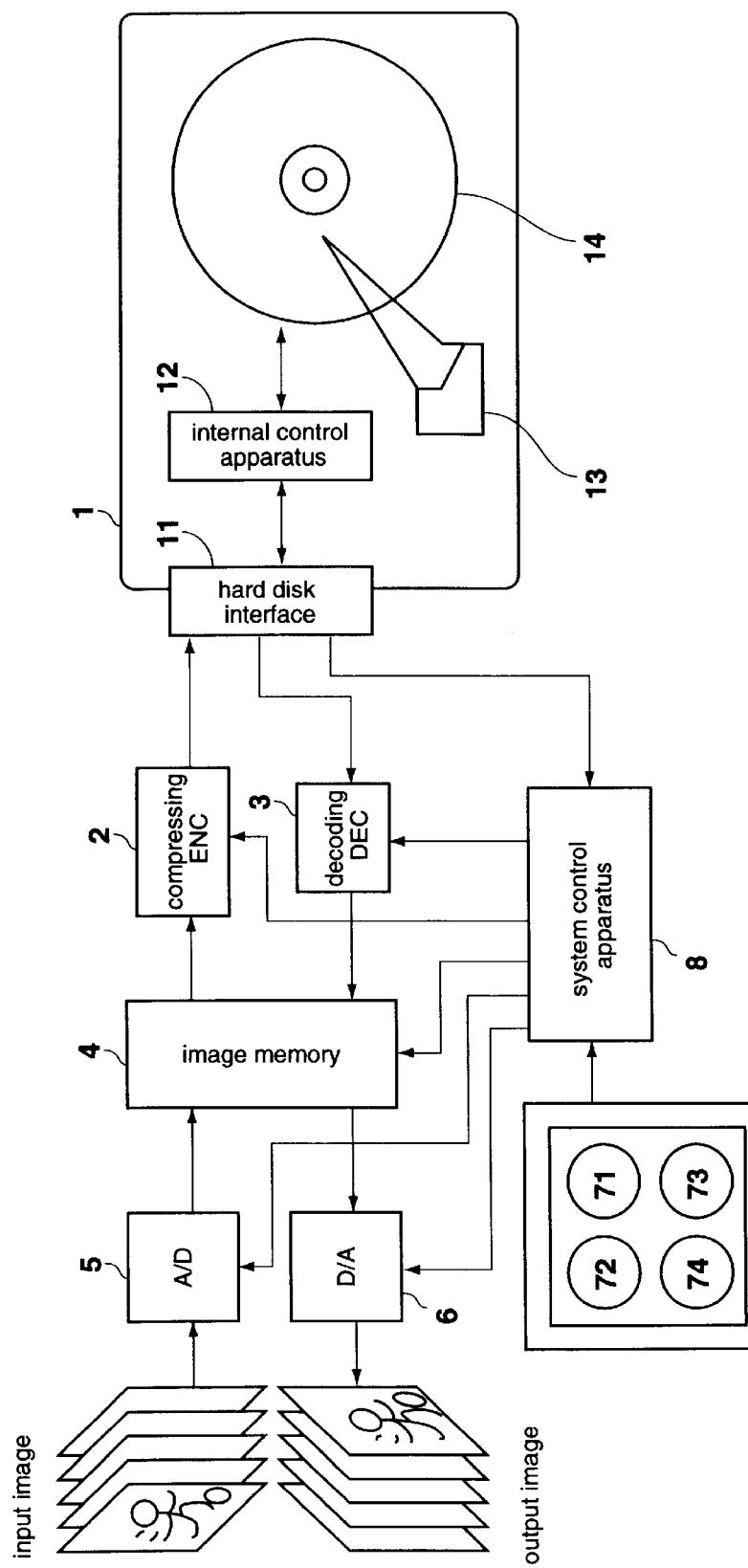
FIG. 5 is a schematic block diagram for showing an arrangement of a hard disk recording/reproducing apparatus to which the present invention is applied.

FIG. 5 is a schematic block diagram for showing an arrangement of a hard disk recording/reproducing apparatus to which the present invention is applied.

As represented in this drawing, the hard disk recording/reproducing apparatus is arranged by a hard disk drive 1, a compressing encoder 2 for compress-decoding frame data of an image to be entered into the hard disk drive 1, and a decoding-decoder 3 for expand-decoding the image frame data outputted from the hard disk drive 1. This hard disk recording/reproducing apparatus is further constructed of an image memory 4 for temporarily storing thereinto either the image frame data outputted from the hard disk drive 1 or the image frame data outputted from the decoding decoder 3, an A/D-converting circuit 5 for A/D-converting an input image into image data and for supplying this image data to the image memory 4, and a D/A-converting circuit 6 for D/A-converting the image data read from the image memory 4 into an analog image signal to obtain an output image.

Also, this hard disk recording/reproducing apparatus is constituted by a user interface key 7, and a system control apparatus 8 for controlling the overall apparatus in response to the input information of the user interface key 7. The user interface key 7 is equipped with a moving picture image recording key 71, a still picture image recording key 72, a moving picture image reproducing key 73, and a still picture image reproducing key 74.

The hard disk drive 1 is constructed of a hard disk interface 11, a hard disk internal control apparatus 12, a magnetic head 13, and a magnetic disk 14. Then, the data is recorded and/or reproduced by designating the sector address from the external system via the hard disk interface 11, and issuing read/write commands.

(2) RECORDING/REPRODUCING OPERATION OF MOVING PICTURE IMAGE DATA

Referring now to FIG. 4 and FIG. 5, operations will now be explained. First, recording/reproducing operations of moving picture data will now be described.

(a) RECORDING OPERATION

When the moving picture image recording key 71 of the user interface key 7 is depressed, the system control apparatus 8 controls the A/D converting circuit 5 and the image memory 4, so that the moving picture image data of the input image digitalized by the A/D converting circuit 5 is temporarily stored in the image memory 4. It should be noted that the input image is, for example, a video signal of the NTSC system.

Next, the moving picture image data read out from the image memory 4 is compress-coded by the coding encoder 2, and then the compress-coded moving picture image data is supplied to the hard disk interface 11. In this case, before the compress-coded moving picture image data is supplied to the hard disk interface 11, the system control apparatus 8 previously notifies the starting address of the moving picture image recording area defined from the zone 1 to the zone 3 shown in FIG. 4 to the hard disk internal control apparatus 12 of the hard disk drive 1. Then, the hard disk drive 1 moves the magnetic head 13 to such a track designated by this starting address so that this track is brought into a recordable condition for the moving picture image data.

In accordance with the above-described manner, the moving picture image data which has been entered from the hard disk interface 11 and compress-coded is recorded in the moving picture image data area on the magnetic disk 14. After this memory picture image data has been recorded for a time period determined on the side of the system, this recording operation is accomplished.

(b) REPRODUCING OPERATION

Upon depression of the moving picture image reproducing key 73 of the user interface key 7, the system control apparatus 8 notifies a reproduction starting address of desired moving picture image data within the moving picture image recording area defined from the zone 1 to the zone 3 with respect to the hard disk internal control apparatus 12 of the hard disk drive 1 via the hard disk interface 11 in order to reproduce the recorded moving picture image data.

The hard disk internal control apparatus 12 reproduces the compress-coded moving picture image data in response to the notified desirable sector address, and then supplies the reproduced moving picture image data via the hard disk interface 11 to the decoding decoder 3.

The decoding decoder 3 decodes/expands the compress-coded moving picture image data, and causes the decoded moving picture image data to be temporarily stored into the image memory 4. The decoded/expanded moving picture image data which has been temporarily stored in the image memory 4 is D/A-converted by the D/A converting circuit 6 to produce an output image.

When the above-described reproducing operation is continued for a time period determined on the side of the system to reproduce the moving picture image data, this reproducing operation is accomplished.

(3) RECORDING/REPRODUCING OPERATIONS OF STILL PICTURE IMAGE DATA

A basic operation of recording/reproducing of still picture image data is similar to that when the moving picture image data is recorded/reproduced. It should be understood that the still picture image data is recorded/reproduced in/from the still picture image recording area defined from the zone 4 to the zone 6. Then, an image to be recorded/reproduced is only 1 frame of, for example, a video signal in the NTSC system, which does not require real time characteristics. Also, system data such as time information and file information used on the side of the system may be recorded/reproduced in/from the area defined from the zone 4 to the zone 6.

[3] REMOVABLE DISK RECORDING/REPRODUCING APPARATUS TO WHICH PRESENT INVENTION IS APPLIED (1) ARRANGEMENT OF RECORDING/REPRODUCING APPARATUS

FIG. 6 is a schematic block diagram for showing an arrangement of a removable disk recording/reproducing apparatus to which the present invention is applied. It should be noted that since the constructive units other than a removable disk drive 1' and a work memory 9 for a control apparatus are identical to those of the hard disk recording/reproducing apparatus shown in FIG. 5, the same reference numerals are employed. Thus, descriptions of these same constructive units are omitted. It should also be noted that portions of the removable disk drive 1', corresponding to those of the hard disk drive 1 of FIG. 5, are denoted by the same reference numerals and symbol "'".

The removable disk drive 1' is arranged by a removable disk interface 11', a removable disk internal control apparatus 12', and a removable disk reading apparatus 13'. Then, the removable disk 14 is inserted into the removable disk drive 1' so as to be used.

The removable disk 14 contains a removable disk information recording area 15 which saves zoning information of the removable disk. The zoning information is defined by a total number of zones, a starting sector address and an end sector address in each zone, a total number of sectors, a transfer rate in each zone, a sort of media and so on.

It should be noted that although this removable disk information recording area 15 is arranged at the outermost peripheral portion as shown in FIG. 6, this removable disk information recording area 15 may be arranged at an innermost peripheral portion, at a only reproduceable area of this disk, or at a recordable/reproduceable area of the disk.

Furthermore, this removable disk information recording area 15 may be stored in a semiconductor memory (RAM or ROM) separately provided with the disk. Alternatively, holes or the like are formed in the housing of the removable disk 14, and these holes may be discriminated by the system control apparatus 8.

When the removable disk 14 is inserted into the removable disk drive 1', the removable disk information 15 is supplied via the removable disk interface 11 to the system control apparatus 8. The data is recorded and/or reproduced by issuing a sector address, and a read/write command via the removable disk interface 11 from the external system.

The work memory 9 for control apparatus corresponds to a work memory used by the system control apparatus 8 which is also used to temporarily store the system data.

(2) INITIALIZATION OF SYSTEM

Next, a description will now be made of operations of the removable disk recording/reproducing apparatus shown in FIG. 6. First, an initialization of the system is explained. When the removable disk 14 is inserted into the removable disk drive 1', the system control apparatus 8 issues a removable disk information read command to the removable disk drive 1.

Upon receipt of this removable disk information read command, the removable disk internal control apparatus 12' moves the removable disk reading apparatus 13' to the removable disk information recording area 15, and reads out the zoning information of the removable disk.

The zoning information of the removable disk is transferred via the removable disk interface 11' to the system control apparatus 8, and then is stored in the work memory 9 for control apparatus.

The system control apparatus 8 discriminates a zone in this removable disk 14 where the data transfer operation can be done in the transfer rate requested by the host system side from another zone where the data transfer operation cannot be carried out in the transfer rate requested by the host system side. Then, the system control apparatus 8 determines that the former zone is the moving picture image recording area, and the latter zone is the still picture image or system data recording area. Then, this area determination information is stored in the work memory 9 for control apparatus.

(3) RECORDING/REPRODUCING OPERATION OF MOVING PICTURE IMAGE DATA

Next, recording/reproducing operations of moving picture data will now be described.

(a) RECORDING OPERATION

First, a description will now be made of the recording operation. When the moving picture image recording key 71 of the user interface key 7 is depressed, the system control apparatus 8 controls the A/D converting circuit 5 and the image memory 4, so that the moving picture image data of the input image digitalized by the A/D converting circuit 5 is temporarily stored in the image memory 4.

Next, the moving picture image data read out from the image memory 4 is compress-coded by the coding encoder 2, and then the compress-coded moving picture image data is supplied to the removable disk interface 11'. In this case, before the compress-coded moving picture image data is supplied to the removable disk interface 11', the system control apparatus 8 previously notifies the starting address of the moving picture image recording area set during the above-described initialization to the removable disk internal control apparatus 12' of the removable disk drive 1'. Then, the removable disk drive 1' moves the removable disk reading apparatus 13' to such a track designated by this starting address so that this track is brought into a recordable condition for the moving picture image data.

In accordance with the above-described manner, the moving picture image data which has been entered from the removable disk interface 11' and compress-coded is recorded in the moving picture image data area on the removable disk 14'. After this memory picture image data has been recorded for a time period determined on the side of the system, this recording operation is accomplished.

(b) REPRODUCING OPERATION

Upon depression of the moving picture image reproducing key 73 of the user interface key 7, the system control apparatus 8 notifies a reproduction starting address of desired moving picture image data within the moving picture image recording area with respect to the removable disk internal control apparatus 12' of the removable disk drive 1' via the removable disk interface 11' in order to reproduce the recorded moving picture image data.

The removable disk internal control apparatus 12' reproduces the compress-coded moving picture image data in response to the notified desirable sector address, and then supplies the reproduced moving picture image data via the removable disk interface 11' to the decoding decoder 3.

The decoding decoder 3 decodes/expands the compress-coded moving picture image data, and causes the decoded moving picture image data to be temporarily stored into the image memory 4. The decoded/expanded moving picture image data which has been temporarily stored in the image memory 4 is D/A-converted by the D/A converting circuit 6 to produce an output image.

When the above-described reproducing operation is continued for a time period determined on the side of the system to reproduce the moving picture image data, this reproducing operation is accomplished.

(4) RECORDING/REPRODUCING OPERATIONS OF STILL PICTURE IMAGE DATA

A basic operation of recording/reproducing of still picture image data is similar to that when the moving picture image data is recorded/reproduced. It should be understood that the still picture image data is recorded/reproduced in/from the still picture image recording area. Then, an image to be recorded/reproduced is only 1 frame of, for example, a video signal in the NTSC system, which does not require real time characteristics. Also, system data such as time information and file information used on the side of the system may be recorded/reproduced in/from the still picture or system data recording area.

It should be understood that the present invention is not limited to the above-described embodiment modes, but may be modified based upon the gist of the present invention without departing from the technical spirit and scope of the present invention. For instance, the below-mentioned modifications (1) and (2) may be achieved.

(1) The moving picture image data is recorded/reproduced in/from the zones 1 to 3 shown in FIG. 4, and such moving picture image data whose screen size has been reduced (for example, reduced by ½ along horizontal and vertical directions) is recorded/reproduced in/from the zones 4 to 6.

(2) The moving picture image data is recorded/reproduced in/from the zones 1 to 3 shown in FIG. 4, and such moving picture image data whose frame number has been lowered (for instance, 15 frames/second) is recorded/reproduced in/from the zones 4 to 6.

Alternatively, image data to be recorded/reproduced in accordance with the present invention may be non-compressed image data. Furthermore, if a disk-shaped recording medium may be recorded/reproduced in accordance with the ZCAV system, then the present invention may be similarly applied not only to a magnetic disk, but also to a magneto optical disk as well as a phase change type optical disk.

While the present invention has been described in detail, the moving picture image data is arranged in the region on the outer peripheral side of the recording medium, where the data transfer rate is high, whereas the still picture image data or system data is arranged in the region on the inner peripheral side thereof, where the data transfer rate is low. As a consequence, since the moving picture image data can be recorded/reproduced at the higher transfer rate than the minimum transfer rate, the moving picture image containing a large information amount and a high image quality can be recorded/reproduced.

Furthermore, in the conventional system, the system must grasp the sector address/data connections. That is, which data is arranged at a certain sector address, and then, is connected to which sector address. The convention system must carry out the complex address management. To the contrary, according to the present invention, the moving picture image data recording area and the still picture image or system data recording area are subdivided into two recording areas with respect to the boundary defined by a certain sector address. As a consequence, the sector addresses can be readily managed.

What is claimed is:

1. A method for recording at least image data on a disk shaped recording medium to decrease random storage of image data having relatively large amounts of data and reduce access time of said image data, comprising the steps of:
    determining automatically whether the image data has a relatively large amount of data or a relatively small amount of data;
    recording the image data having a relatively large amount of data in an outer peripheral region of said disk-shaped recording medium in order to decrease random storage of image data having relatively large amounts of data and reduce access time of said image data; and
    recording the image data, having a relatively small amount of data in an inner peripheral region of said disk-shaped recording medium.

2. The method for recording according to claim 1, wherein said step of determining determines whether said image data has a relatively large amount of data so as to be motion picture image data or a relatively small amount of data so as to be still picture image data.

3. The method for recording according to claim 1, wherein said step of recording records image data having a relatively large amount of data from continuous sectors on said disk-shaped recording medium.

4. The method for recording according to claim 1, further comprising the step of compressing said image data having a relatively large amount of data in accordance with MPEG standards.

5. The method for recording according to claim 1, wherein said step of determining determines said image data has a relatively large amount of data in accordance with user selection.

6. The method for recording according to claim 1, further comprising the step of compressing said image data having a relatively large amount of data in accordance with MPEG standards.

7. The method for recording according to claim 1, further comprising the step of determining zones on said disk-shaped recording medium, wherein each zone includes a plurality of adjacent tracks of said disk-shaped recording medium.

8. The method for recording according to claim 7 further comprising the step of recording on said disk-shaped recording medium information indicating a position of said zones on said disk-shaped recording medium.

9. The method for recording according to claim 7, further comprising the step of recording information indicating positions of said zones in a semiconductor memory provided with said disk-shaped recording medium.

10. The method for recording according to claim 1, wherein said relatively small amount of data is motion picture image data with frames reduced in size.

11. The method according to claim 1, wherein said relatively small amount of data is motion picture image data with a number of frames reduced.

12. A method for reproducing at least image data from a disk-shaped recording medium to decrease random storage of image data having relatively large amounts of data and reduce access time of said image data, comprising the steps of:
    determining automatically whether the image data has a relatively large amount of data or a relatively small amount of data;
    reproducing the image data having a relatively large amount of data from an outer peripheral region of said disk-shaped recording medium in order to decrease random storage of image data having relatively large amounts of data and reduce access time of said image data; and
    reproducing the image data, having a relatively small amount of data from an inner peripheral region of said disk-shaped recording medium.

13. The method for reproducing according to claim 12, wherein said step of determining determines whether said image data has a relatively large amount of data so as to be motion-picture image data or a relatively small amount of data so as to be still picture image data.

14. The method for reproducing according to claim 12, wherein said step of reproducing reproduces image data having a relatively large amount of data from continuous sectors on said disk-shaped recording medium.

15. A method for recording/reproducing at least image data with respect to a disk-shaped recording medium to decrease random storage of image data having relatively large amounts of data and reduce access time of said image data, comprising the steps of:
    determining automatically whether the image data has a relatively large amount of data or a relatively small amount of data;
    recording/reproducing the image data having a relatively large amount of data in an outer peripheral region of said disk-shaped recording medium in order to decrease random storage of image data having relatively large amounts of data and reduce access time of said image data; and
    recording/reproducing one of image data and system data, having a relatively small data in an inner peripheral region of said disk-shaped recording medium.

16. A recording/reproducing method as claimed in claim 15 wherein:
    said image data having the relatively large amount of data is motion picture image data, whereas said image data having the relatively small amount of data is still picture image data.

17. A recording apparatus to decrease random storage of image data having relatively large amounts of data and reduce access time of said image data comprising:

first means for recording image data with respect to a disk-shaped recording medium in which an outer peripheral region thereof is recordable/reproducible at a higher rate than that of an inner peripheral sided region thereof; and second means for automatically determining and designating whether image data to be recorded in said disk-shaped recording medium has a relatively large amount of data or a relatively small amount of data, wherein when said second means designates image data having a relatively large amount of data, said first means records said image data having the relatively large amount of data in the inner peripheral region of said disk-shaped recording medium, whereas when said second means designates image data having a relatively small amount of data, said first means records said image data having the relatively small amount of data in the inner peripheral region of said disk-shaped recording medium in order to decrease random storage of image data having relatively large amounts of data and reduce access time of said image data.

18. The recording apparatus according to claim 17, wherein said second means for designating designates said image data having a relatively large amount of data to be motion picture image data and image data having a relatively small amount of data to be still picture image data.

19. The recording apparatus according to claim 17 wherein said first means records said image data having a relatively large amount of data on continuous sectors of said disk-shaped recording medium.

20. The recording apparatus according to claim 17, wherein said second means for designating designates said image data having a relatively large amount of data in accordance with user selection.

21. The recording apparatus according to claim 17 further comprising compressing means for compressing said image data having a relatively large amount of data in accordance with MPEG standards.

22. The recording apparatus according to claim 17, further comprising means for determining zones on said disk-shaped recording medium, each zone including a plurality of adjacent tracks of said disk-shaped recording medium.

23. The recording apparatus according to claim 22, further comprising recording means for recording on said disk-shaped recording medium indicating positions of said zones on said disk-shaped recording medium.

24. The recording apparatus according to claim 22, further comprising recording means for recording information indicating positions of said zones in a semiconductor memory provided with said disk-shaped recording medium.

25. The recording apparatus according to claim 17, wherein said second means designates motion picture image data with frames reduced in size as said image data having a relatively small amount of data.

26. The recording apparatus according to claim 17, wherein said second means designates motion picture image data with a number of frames reduced as said image data having a relatively small amount of data.

27. A reproducing apparatus to decrease random storage of image data having relatively large amounts of data and reduce access time of said image data comprising:

first means for reproducing image data recorded in an outer peripheral region of a disk-shaped recording medium at a higher rate than that of an inner peripheral region thereof;

second means for automatically determining and designating whether image data to be reproduced from said disk-shaped recording medium has a relatively large amount of data or a relatively small amount of data;

wherein when said second means designates image data having a relatively large amount of data, said first means reproduces said image data having the relatively large amount of data from the inner peripheral region of said disk-shaped recording medium, whereas when said second means designates image data having a relatively small amount of data, said first means reproduces said image data having the relatively small amount of data from the inner peripheral region of said disk-shaped recording medium in order to decrease random storage of image data having relatively large amounts of data and reduce access time of said image data.

28. The reproducing apparatus according to claim 27, wherein said second means designates motion picture image data as said image data having a relatively large amount of data and still picture image data as said image data having a relatively small amount of data.

29. The reproducing apparatus according to claim 27, wherein said first means reproduces said image data having a relatively large amount of data from continuous sectors on said disk-shaped recording medium.

30. A recording/reproducing apparatus to decrease random storage of image data having relatively large amounts of data and reduce access time of said image data comprising:

first means for recording/reproducing image data with respect to a disk-shaped recording medium in which an outer peripheral region thereof is recordable/reproducible at a higher rate than that of an inner peripheral region thereof; and second means for automatically determining and designating whether said image data recorded/reproduced in/from said disk-shaped recording medium has a relatively large amount of data or a relatively small amount of data, wherein when said second means designates image data having a relatively large amount of data, said first means records/reproduces said image data having the large data amount per unit time in the outer peripheral region of said disk-shaped recording medium, whereas when said second means designates image data having a relatively small amount of data, said first means records/reproduces said image data having the relatively small amount of data in/from the inner peripheral region of said disk-shaped recording medium to decrease random storage of image data having relatively large amounts of data and reduce access time of said image data.

31. A disk-shaped recording medium produced in accordance with the steps of storing image data automatically determined to have a relatively large amount of data in an outer peripheral region of said disk-shaped recording medium; storing image data automatically determined to have a relatively small amount of data in an inner peripheral region thereof; and storing information used to discriminate between each of said regions and a transfer rate of data in order to decrease random storage of image data having relatively large amounts of data and reduce access time of said image data.

32. A disk-shaped recording medium as claimed in claim 31 wherein the data is recorded and/or reproduced in units of a sector.

33. A disk-shaped recording medium as claimed in claim 32, wherein:

a region of said disk-shaped recording medium is subdivided into a plurality of coaxial-shaped zones each having a plurality of coaxial-shaped tracks; and a quantity of sectors within 1 track of an outer peripheral zone is large, whereas a quantity of sectors within 1 track of an inner peripheral zone is small.

34. The disk-shaped recording medium according to claim 31, wherein motion picture image data is stored as said image data having a relatively large amount of data on said outer peripheral region of said disk-shaped recording medium and still picture image data is stored as said image data having a relatively small amount of data on said inner peripheral region of said disk-shaped recording medium.

35. The disk-shaped recording medium of claim 31, wherein said image data having a relatively large amount of data is stored on continuous sectors on said disk-shaped recording medium.

36. The disk-shaped recording medium of claim 31, wherein said disk-shaped recording medium is a hard disk.

37. The disk-shaped recording medium according to claim 31, wherein said disk-shaped recording medium is a removable disk.

* * * * *